(12) United States Patent
Hirabe

(10) Patent No.: US 11,368,198 B2
(45) Date of Patent: Jun. 21, 2022

(54) CALIBRATION CONTROL APPARATUS, CALIBRATION CONTROL METHOD, NON-TRANSITORY COMPUTER READABLE MEDIUM, AND CALIBRATION SYSTEM

(71) Applicant: NEC Corporation, Tokyo (JP)

(72) Inventor: Masashi Hirabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/260,067

(22) PCT Filed: Jul. 18, 2019

(86) PCT No.: PCT/JP2019/028213
§ 371 (c)(1),
(2) Date: Jan. 13, 2021

(87) PCT Pub. No.: WO2020/022174
PCT Pub. Date: Jan. 30, 2020

(65) Prior Publication Data
US 2021/0288699 A1    Sep. 16, 2021

(30) Foreign Application Priority Data
Jul. 24, 2018 (JP) .............................. JP2018-138274

(51) Int. Cl.
*H04B 7/0456* (2017.01)
*H01Q 21/20* (2006.01)
(Continued)

(52) U.S. Cl.
CPC .......... *H04B 7/0456* (2013.01); *H01Q 21/20* (2013.01); *H04B 7/0417* (2013.01); *H04B 7/0617* (2013.01); *H04B 7/0848* (2013.01)

(58) Field of Classification Search
CPC .................................................... H04B 7/0456
(Continued)

(56) References Cited

U.S. PATENT DOCUMENTS

2009/0092198 A1*  4/2009  Motoyoshi .............. H04L 1/007
                                                            375/267
2013/0086267 A1*  4/2013  Gelenbe ................ H04L 45/302
                                                            709/225
(Continued)

FOREIGN PATENT DOCUMENTS

| JP | 2013-168751 A | 8/2013 |
| JP | 2017-112570 A | 6/2017 |
| JP | 2017-153018 A | 8/2017 |

OTHER PUBLICATIONS

International Search Report for PCT Application No. PCT/JP2019/028213, dated Oct. 8, 2019.
(Continued)

*Primary Examiner* — Lihong Yu
(74) *Attorney, Agent, or Firm* — Sughrue Mion, PLLC

(57) ABSTRACT

A calibration control apparatus (30) includes a receiving-side correction coefficient calculation unit (31) that calculates a receiving-side correction coefficient for calibrating a characteristic difference between reception units (23) based on a propagation path estimation matrix which has, as a matrix element, a propagation path estimation value of each propagation path from transmission units to reception units (23) in a plurality of transmission units of an OAM mode multiplex transmission apparatus and a plurality of reception units (23) of an OAM mode multiplex reception apparatus (20).

14 Claims, 14 Drawing Sheets

(51) Int. Cl.
  *H04B 7/0417*  (2017.01)
  *H04B 7/06*  (2006.01)
  *H04B 7/08*  (2006.01)

(58) Field of Classification Search
  USPC .......................................................... 375/267
  See application file for complete search history.

(56) References Cited

U.S. PATENT DOCUMENTS

| | | | |
|---|---|---|---|
| 2015/0357710 A1* | 12/2015 | Li | H01Q 3/267 |
| | | | 342/174 |
| 2016/0301479 A1 | 10/2016 | Mary et al. | |
| 2017/0026095 A1 | 1/2017 | Ashraf et al. | |

OTHER PUBLICATIONS

Edfors, Ove et al., "Is Orbital Angular Momentum (OAM) Based Radio Communication an Unexploited Area?", IEEE Transactions on Antennas and Propagation, Feb. 2012, vol. 60, Issue: 2 , pp. 1126-1131.

Lee, Doo-Hwan et al., "An Experimental Demonstration of 28GHz Band Wireless OAM-MIMO (Orbital Angular Momentum Multi-input Multi-output) Multiplexing", 2018 IEEE 87th 2018 Vehicular Technology Conference (VTC spring), Jun. 6, 2018.

Japanese Office Action for JP Application No. 2020-532331 dated Mar. 22, 2022 with English Translation.

\* cited by examiner $$H_{MIMO} = \begin{pmatrix} h_{11} & h_{12} & h_{13} & h_{14} & h_{15} & h_{16} & h_{17} & h_{18} \\ h_{21} & h_{22} & h_{23} & h_{24} & h_{25} & h_{26} & h_{27} & h_{28} \\ h_{31} & h_{32} & h_{33} & h_{34} & h_{35} & h_{36} & h_{37} & h_{38} \\ h_{41} & h_{42} & h_{43} & h_{44} & h_{45} & h_{46} & h_{47} & h_{48} \\ h_{51} & h_{52} & h_{53} & h_{54} & h_{55} & h_{56} & h_{57} & h_{58} \\ h_{61} & h_{62} & h_{63} & h_{64} & h_{65} & h_{66} & h_{67} & h_{68} \\ h_{71} & h_{72} & h_{73} & h_{74} & h_{75} & h_{76} & h_{77} & h_{78} \\ h_{81} & h_{82} & h_{83} & h_{84} & h_{85} & h_{86} & h_{87} & h_{88} \end{pmatrix} = \begin{pmatrix} h_{11} & h_{12} & h_{13} & h_{14} & h_{15} & h_{16} & h_{17} & h_{18} \\ h_{18} & h_{11} & h_{12} & h_{13} & h_{14} & h_{15} & h_{16} & h_{17} \\ h_{17} & h_{18} & h_{11} & h_{12} & h_{13} & h_{14} & h_{15} & h_{16} \\ h_{16} & h_{17} & h_{18} & h_{11} & h_{12} & h_{13} & h_{14} & h_{15} \\ h_{15} & h_{16} & h_{17} & h_{18} & h_{11} & h_{12} & h_{13} & h_{14} \\ h_{14} & h_{15} & h_{16} & h_{17} & h_{18} & h_{11} & h_{12} & h_{13} \\ h_{13} & h_{14} & h_{15} & h_{16} & h_{17} & h_{18} & h_{11} & h_{12} \\ h_{12} & h_{13} & h_{14} & h_{15} & h_{16} & h_{17} & h_{18} & h_{11} \end{pmatrix}$$

Fig. 7

$$T_{error} = \begin{pmatrix} e_{t1} & 0 & 0 & 0 & 0 & 0 & 0 & 0 \\ 0 & e_{t2} & 0 & 0 & 0 & 0 & 0 & 0 \\ 0 & 0 & e_{t3} & 0 & 0 & 0 & 0 & 0 \\ 0 & 0 & 0 & e_{t4} & 0 & 0 & 0 & 0 \\ 0 & 0 & 0 & 0 & e_{t5} & 0 & 0 & 0 \\ 0 & 0 & 0 & 0 & 0 & e_{t6} & 0 & 0 \\ 0 & 0 & 0 & 0 & 0 & 0 & e_{t7} & 0 \\ 0 & 0 & 0 & 0 & 0 & 0 & 0 & e_{t8} \end{pmatrix}$$

Fig. 8

$$R_{error} = \begin{bmatrix} e_{r1} & 0 & 0 & 0 & 0 & 0 & 0 & 0 \\ 0 & e_{r2} & 0 & 0 & 0 & 0 & 0 & 0 \\ 0 & 0 & e_{r3} & 0 & 0 & 0 & 0 & 0 \\ 0 & 0 & 0 & e_{r4} & 0 & 0 & 0 & 0 \\ 0 & 0 & 0 & 0 & e_{r5} & 0 & 0 & 0 \\ 0 & 0 & 0 & 0 & 0 & e_{r6} & 0 & 0 \\ 0 & 0 & 0 & 0 & 0 & 0 & e_{r7} & 0 \\ 0 & 0 & 0 & 0 & 0 & 0 & 0 & e_{r8} \end{bmatrix}$$

Fig. 9

CALIBRATION CONTROL APPARATUS, CALIBRATION CONTROL METHOD, NON-TRANSITORY COMPUTER READABLE MEDIUM, AND CALIBRATION SYSTEM

This application is a National Stage Entry of PCT/JP2019/028213 filed on Jul. 18, 2019, which claims priority from Japanese Patent Application 2018-138274 filed on Jul. 24, 2018, the contents of all of which are incorporated herein by reference, in their entirety.

TECHNICAL FIELD

The present disclosure relates to a calibration control apparatus, a calibration control method, a calibration control program, and a calibration system.

BACKGROUND ART

A technique for estimating a propagation path between antenna elements that form one array antenna by transmitting/receiving a reference signal between the antenna elements and performing calibration of the array antenna using the results of the estimation of the propagation path has been suggested (e.g., Patent Literature 1). In this technique, electromagnetic coupling between the antenna elements that compose the array antenna has been used.

CITATION LIST

Patent Literature

[Patent Literature 1] Japanese Unexamined Patent Application Publication No. 2017-112570

SUMMARY OF INVENTION

Technical Problem

Incidentally, in recent years, a radio transmission method using electromagnetic waves having an orbital angular momentum (OAM) (i.e., OAM mode multiplex transmission system) has been focused on.

The present inventors have found that it is possible that the calibration may not be accurately performed for array antennas used for the OAM mode multiplex transmission system by the technique disclosed in the above Patent Literature 1.

That is, when, in a typical array antenna, the wavelength between antenna elements is about 0.5 wavelength and each of the antenna elements has a low gain (about 5 to 10 dBi), the electromagnetic coupling between the antenna elements becomes about −15 to −20 dB. In this case, it is possible to estimate the propagation path between the antenna elements.

However, in a case of array antennas used for OAM mode multiplex transmission, antenna elements having a high gain (about 20 dBi or higher) are used and these antenna elements are arranged in such a way that they are separated from one another by several wavelengths. Therefore, the present inventors have found that the electromagnetic coupling between the antenna elements becomes about −60 dB or lower and thus it is difficult to obtain a propagation path estimation accuracy that is high enough to be used for calibration.

An object of the present disclosure is to provide a calibration control apparatus, a calibration control method, a calibration control program, and a calibration system capable of improving the accuracy of the calibration of array antennas used for OAM mode multiplex transmission.

Solution to Problem

A calibration control apparatus according to a first aspect is a calibration control apparatus configured to calibrate a characteristic difference between reception units in a plurality of reception units, the plurality of reception units receiving a signal transmitted from an orbital angular momentum (OAM) mode multiplex transmission apparatus including a plurality of transmission units including a plurality of respective transmission antenna elements arranged in a rotationally symmetric manner and at equal distances from the center of rotation symmetry, the plurality of reception units further including a plurality of respective reception antenna elements arranged in a rotationally symmetric manner and at equal distances from the center of rotation symmetry in an OAM mode multiplex reception apparatus that is separated from the OAM mode multiplex transmission apparatus, the calibration control apparatus including: a receiving-side correction coefficient calculation unit configured to calculate a receiving-side correction coefficient for calibrating the characteristic difference between the reception units based on a propagation path estimation matrix that has, as a matrix element, a propagation path estimation value of each propagation path from the transmission units to the reception units in the plurality of transmission units and the plurality of reception units.

A calibration control apparatus according to a second aspect is a calibration control apparatus configured to calibrate a characteristic difference between transmission units in a plurality of transmission units, the plurality of transmission units transmitting an OAM mode multiplex signal to an OAM mode multiplex reception apparatus including a plurality of reception units including a plurality of respective reception antenna elements arranged in a rotationally symmetric manner and at equal distances from the center of rotation symmetry, the plurality of transmission units further including a plurality of transmission antenna elements arranged in a rotationally symmetric manner and at equal distances from the center of rotation symmetry in an OAM mode multiplex transmission apparatus that is separated from the OAM mode multiplex reception apparatus, the calibration control apparatus including: an acquisition unit configured to acquire a feedback signal formed by the OAM mode multiplex reception apparatus based on a propagation path estimation matrix that has, as a matrix element, a propagation path estimation value of each propagation path from the transmission units to the reception units in the plurality of transmission units and the plurality of reception units; and a correction coefficient forming unit configured to form, based on the acquired feedback signal, a transmitting-side correction coefficient for calibrating a characteristic difference between the transmission units in the OAM mode multiplex transmission apparatus.

A calibration control method according to a third aspect is a calibration control method for calibrating a characteristic difference between reception units in a plurality of reception units including a plurality of respective reception antenna elements arranged in a rotationally symmetric manner and at equal distances from the center of rotation symmetry in an OAM mode multiplex reception apparatus configured to receive a signal transmitted from an OAM mode multiplex transmission apparatus including a plurality of transmission units including a plurality of respective transmission antenna elements arranged in a rotationally symmetric manner and at equal distances from the center of rotation symmetry, the calibration control method including: calculating a reception characteristic variation matrix regarding a characteristic variation between the reception units based on a propagation path estimation matrix that has, as a matrix element, a propagation path estimation value of each propagation path from the transmission units to the reception units in the plurality of transmission units and the plurality of reception units.

A calibration control method according to a fourth aspect is a calibration control method for calibrating a characteristic difference between transmission units in a plurality of transmission units including a plurality of respective transmission antenna elements arranged in a rotationally symmetric manner and at equal distances from the center of rotation symmetry in an OAM mode multiplex transmission apparatus, the OAM mode multiplex transmission apparatus transmitting an OAM mode multiplex signal to an OAM mode multiplex reception apparatus including a plurality of reception units including a plurality of respective reception antenna elements arranged in a rotationally symmetric manner and at equal distances from the center of rotation symmetry, the calibration control method including: acquiring a feedback signal formed by the OAM mode multiplex reception apparatus based on a propagation path estimation matrix that has, as a matrix element, a propagation path estimation value of each propagation path from the transmission units to the reception units in the plurality of transmission units and the plurality of reception units; and forming, based on the acquired feedback signal, a transmitting-side correction coefficient for calibrating a characteristic difference between transmission units in the OAM mode multiplex transmission apparatus.

A calibration control program according to a fifth aspect is a calibration control program for causing a calibration control apparatus configured to calibrate a characteristic difference between reception units in a plurality of reception units, the plurality of reception units receiving a signal transmitted from an orbital angular momentum (OAM) mode multiplex transmission apparatus including a plurality of transmission units including a plurality of respective transmission antenna elements arranged in a rotationally symmetric manner and at equal distances from the center of rotation symmetry, the plurality of reception units further including a plurality of respective reception antenna elements arranged in a rotationally symmetric manner and at equal distances from the center of rotation symmetry in an OAM mode multiplex reception apparatus that is separated from the OAM mode multiplex transmission apparatus to execute the following processing of: calculating a receiving-side correction coefficient for calibrating the characteristic difference between the reception units based on a propagation path estimation matrix that has, as a matrix element, a propagation path estimation value of each propagation path from the transmission units to the reception units in the plurality of transmission units and the plurality of reception units.

A calibration control program according to a sixth aspect is a calibration control program for causing a calibration control apparatus configured to calibrate a characteristic difference between transmission units in a plurality of transmission units, the plurality of transmission units transmitting an OAM mode multiplex signal to an OAM mode multiplex reception apparatus including a plurality of reception units including a plurality of respective reception antenna elements arranged in a rotationally symmetric manner and at equal distances from the center of rotation symmetry, the plurality of transmission units including a plurality of respective transmission antenna elements arranged in a rotationally symmetric manner and at equal distances from the center of rotation symmetry in an OAM mode multiplex transmission apparatus that is separated from the OAM mode multiplex reception apparatus to execute the following processing of: acquiring a feedback signal formed by the OAM mode multiplex reception apparatus based on a propagation path estimation matrix that has, as a matrix element, a propagation path estimation value of each propagation path from the transmission units to the reception units in the plurality of transmission units and the plurality of reception units; and forming, based on the acquired feedback signal, a transmitting-side correction coefficient for calibrating a characteristic difference between the transmission units in the OAM mode multiplex transmission apparatus.

A calibration system according to a seventh aspect is a calibration system for calibrating a characteristic difference between transmission units in a plurality of transmission units including a plurality of respective transmission antenna elements arranged in a rotationally symmetric manner and at equal distances from the center of rotation symmetry in an OAM mode multiplex transmission apparatus and a characteristic difference between reception units in a plurality of reception units, the plurality of reception units receiving signals transmitted from the OAM mode multiplex transmission apparatus and including a plurality of respective reception antenna elements arranged in a rotationally symmetric manner and at equal distances from the center of rotation symmetry in an OAM mode multiplex reception apparatus that is separated from the OAM mode multiplex transmission apparatus, the calibration system including: a receiving-side correction coefficient calculation unit configured to calculate a receiving-side correction coefficient for calibrating the characteristic difference between the reception units based on a propagation path estimation matrix that has, as a matrix element, a propagation path estimation value of each propagation path from the transmission units to the reception units in the plurality of transmission units and the plurality of reception units; and a transmitting-side correction coefficient calculation unit configured to calculate, based on the propagation path estimation matrix, a transmitting-side correction coefficient for calibrating the characteristic difference between the transmission units.

Advantageous Effects of Invention

According to the present disclosure, it is possible to provide a calibration control apparatus, a calibration control method, a calibration control program, and a calibration system capable of improving accuracy of calibration of array antennas used for OAM mode multiplex transmission.

BRIEF DESCRIPTION OF DRAWINGS

FIG. 7 is a diagram showing one example of a space propagation path estimation matrix $H_{MIMO}$;

FIG. 8 is a diagram showing one example of a transmission characteristic variation matrix $T_{error}$;

FIG. 9 is a diagram showing one example of a reception characteristic variation matrix $R_{error}$;

DESCRIPTION OF EMBODIMENTS

Hereinafter, with reference to the drawings, example embodiments will be described. Throughout the example embodiments, the same or equivalent components are denoted by the same reference symbols and the overlapping descriptions will be omitted.

First Example Embodiment

<Configuration Example of OAM Communication System>

Figure 1:
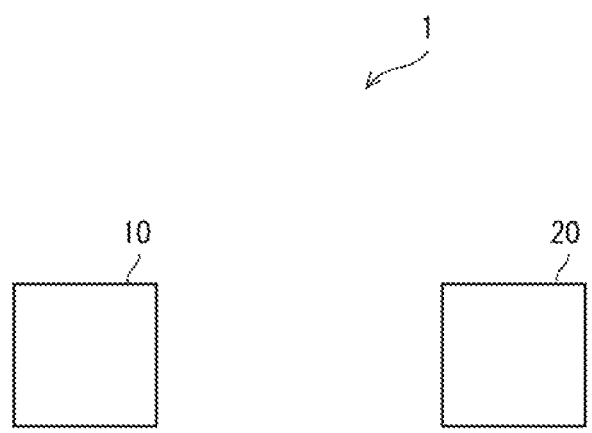
FIG. 1 is a diagram showing one example of an OAM multiplex mode transmission system according to a first example embodiment.

FIG. 1 is a diagram showing one example of an OAM multiplex mode transmission system according to a first example embodiment. In FIG. 1, an OAM multiplex mode transmission system 1 includes an orbital angular momentum (OAM) mode multiplex transmission apparatus 10 and an OAM mode multiplex reception apparatus 20. In the following description, the OAM mode multiplex transmission apparatus 10 may be simply referred to as a "transmission apparatus 10" and the OAM mode multiplex reception apparatus 20 may be simply referred to as a "reception apparatus 20".

The transmission apparatus 10 transmits an OAM mode multiplexed signal to the reception apparatus 20 and the reception apparatus 20 receives the signal transmitted from the transmission apparatus 10.

<Configuration Example of OAM Mode Multiplex Transmission Apparatus>

Figure 2:
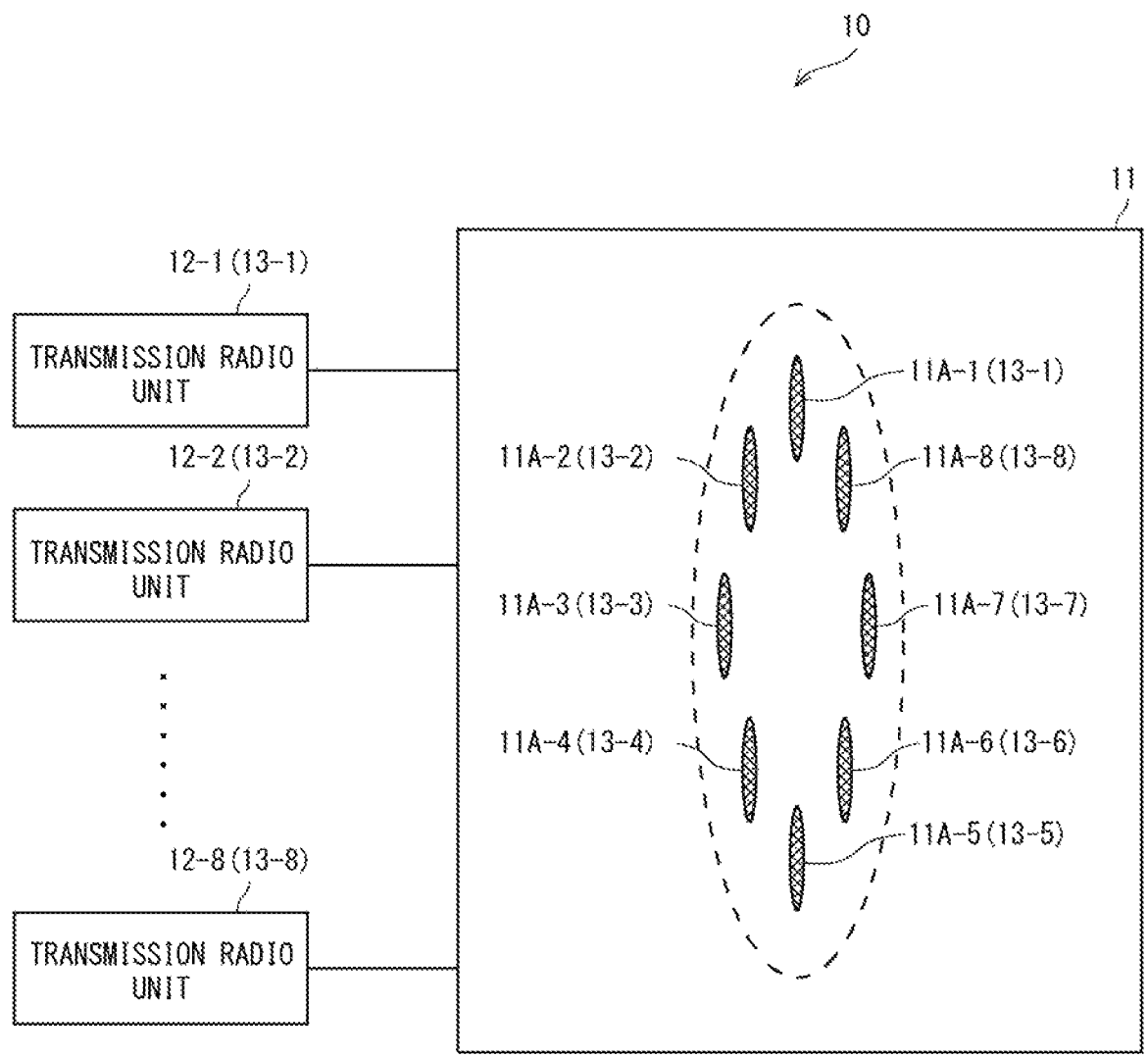
FIG. 2 is a block diagram showing one example of an OAM mode multiplex transmission apparatus according to the first example embodiment.

FIG. 2 is a block diagram showing one example of the OAM mode multiplex transmission apparatus according to the first example embodiment. In FIG. 2, the transmission apparatus 10 includes an antenna part 11 and transmission radio units 12-1 to 12-8. In the following description, the transmission radio units 12-1 to 12-8 may be collectively referred to as a "transmission radio unit 12".

The antenna part 11 includes transmission antenna elements 11A-1 to 11A-8 that are circularly arranged. In the following description, the transmission antenna elements 11A-1 to 11A-8 may be collectively referred to as a "transmission antenna element 11A".

The transmission radio units 12-1 to 12-8 respectively correspond to the transmission antenna elements 11A-1 to 11A-8. The transmission radio unit 12 is connected to the corresponding transmission antenna element 11A. The transmission radio unit 12 and the transmission antenna element 11A that are connected to each other are included in one transmission unit 13. For example, the transmission radio unit 12-1 and the transmission antenna element 11A-1 are included in a transmission unit 13-1. Then the transmission radio unit 12 executes transmission radio processing (digital/analog conversion, up-converting, amplification etc.) on the input transmission signal and transmits the obtained radio signal via the corresponding transmission antenna element 11A.

The transmission units 13-1 to 13-8 transmit, for example, eight respective known pattern sequence signals different from one another. The transmission units 13-1 to 13-8 may transmit the known pattern sequence signals at the same time or may transmit them in time division. These known pattern sequence signals are used to at least calculate a "propagation path estimation matrix $H_{rx}$" in the OAM mode multiplex reception apparatus 20 that will be described later.

While the description has been given assuming that the transmission apparatus 10 includes eight transmission antenna elements 11A, eight transmission radio units 12, and eight transmission units 13, this number is not limited to it and may be any number equal to or larger than two. Even when the number of transmission antenna elements 11A is two, it can be said that they are circularly arranged since these two transmission antenna elements 11A may be arranged on one circle. Further, in other words, it is sufficient that the plurality of transmission antenna elements 11A provided in the transmission apparatus 10 be arranged in a rotationally symmetric manner and at equal distances from the center of rotational symmetry (not shown).

<Configuration Example of OAM Mode Multiplex Reception Apparatus>

Figure 3:
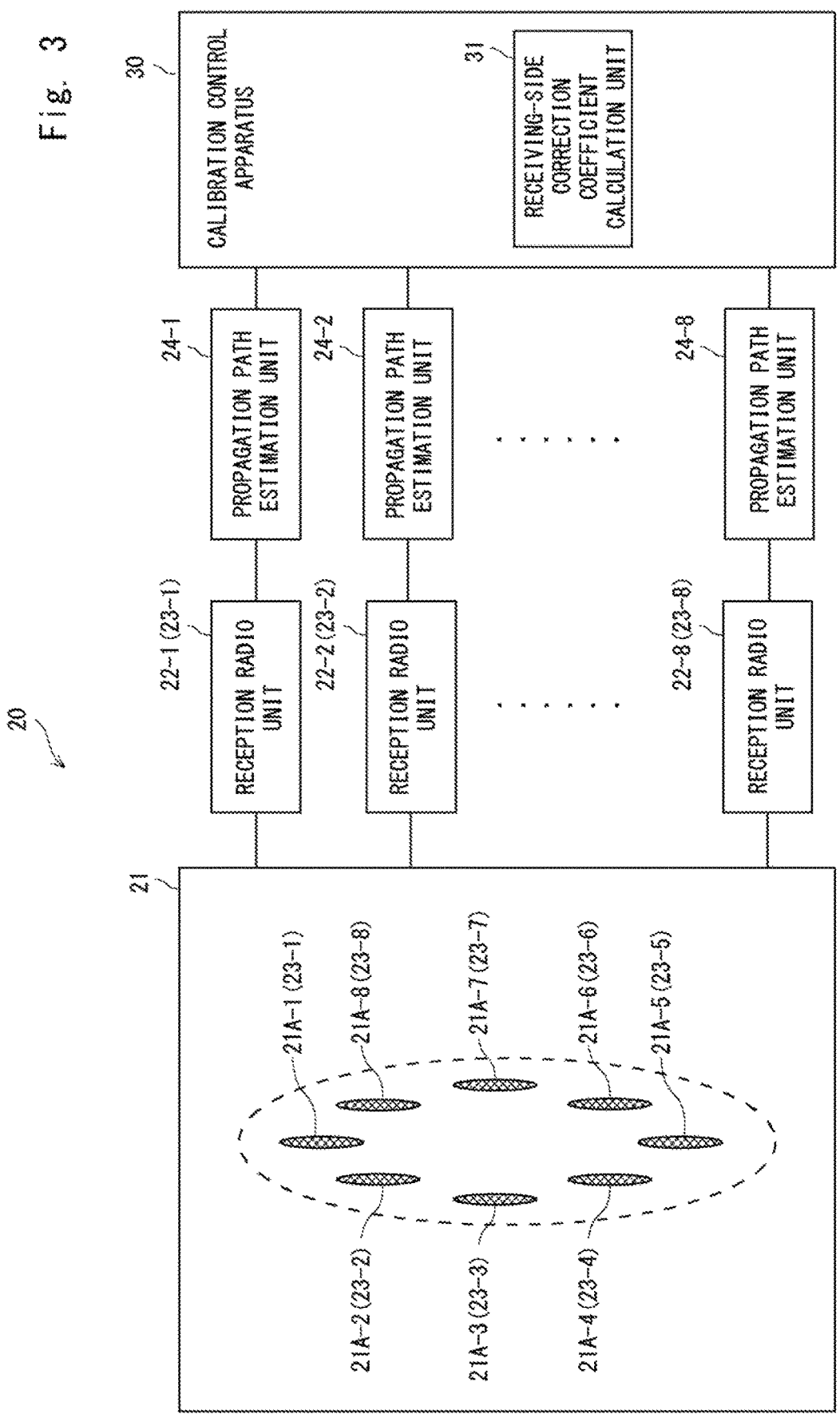
FIG. 3 is a block diagram showing one example of an OAM mode multiplex reception apparatus according to the first example embodiment.

FIG. 3 is a block diagram showing one example of the OAM mode multiplex reception apparatus according to the first example embodiment. In FIG. 3, the OAM mode multiplex reception apparatus 20 includes an antenna part 21, reception radio units 22-1 to 22-8, propagation path estimation units 24-1 to 24-8, and a calibration control apparatus (calibration control unit) 30. In the following description, the reception radio units 22-1 to 22-8 may be collectively referred to as a "reception radio unit 22". Further, the propagation path estimation units 24-1 to 24-8 may be collectively referred to as a "propagation path estimation unit 24".

The antenna part 21 includes reception antenna elements 21A-1 to 21A-8 that are circularly arranged. In the following description, the reception antenna elements 21A-1 to 21A-8 may be collectively referred to as a "reception antenna element 21A".

The reception radio units 22-1 to 22-8 respectively correspond to the reception antenna elements 21A-1 to 21A-8. The reception radio unit 22 is connected to the corresponding reception antenna element 21A. The reception radio unit 22 and the reception antenna element 21A that are connected to each other are included in one reception unit 23. For example, the reception radio unit 22-1 and the reception antenna element 21A-1 are included in one reception unit 23-1. Then the reception radio unit 22 executes reception radio processing (amplification, down-converting, analog/digital conversion etc.) on a reception radio signal input via the corresponding reception antenna element 21A and outputs the obtained reception signal to the propagation path estimation unit 24. Here, the reception signal obtained in the reception radio unit 22 is a signal in which a known pattern sequence signal transmitted from the transmission apparatus 10 is multiplexed.

The propagation path estimation units 24-1 to 24-8 respectively correspond to the reception radio units 22-1 to 22-8. The propagation path estimation unit 24 calculates a correlation value between the reception signal received from the reception radio unit 22 and each known pattern sequence signal and calculates a propagation path estimation value of each propagation path between the transmission unit 13 and the reception unit 23 based on the calculated correlation value. Accordingly, the "propagation path estimation matrix $H_{rx}$" having a propagation path estimation value of each propagation path as a matrix element can be obtained.

The calibration control apparatus 30 includes a receiving-side correction coefficient calculation unit 31. The receiving-side correction coefficient calculation unit 31 calculates a receiving-side correction coefficient for calibrating a characteristic difference between the reception units 23 based on the propagation path estimation matrix $H_{rx}$ obtained in the propagation path estimation unit 24. Then the calibration control apparatus 30 outputs the receiving-side correction coefficient calculated for each reception unit 23 to the corresponding reception radio unit 22. Then the reception radio unit 22 corrects the phase and the amplitude of the reception signal corresponding to the OAM mode multiplex signal according to the data signal transmitted from the OAM mode multiplex transmission apparatus 10 based on the receiving-side correction coefficient. Accordingly, it is possible to achieve OAM mode multiplex reception which is equivalent to the state in which the features between the reception units 23 are uniform.

While the description has been made assuming that the reception apparatus 20 includes the eight reception antenna elements 21A, the eight reception radio units 22, and the eight reception units 23, this number is not limited to it and may be any number equal to or larger than two. Even in a case in which the number of reception antenna elements 21A is two, it can be said that they are circularly arranged since these two reception antenna elements 21A may be provided on one circle. Further, in other words, it is sufficient that the plurality of reception antenna elements 21A provided in the reception apparatus 20 be arranged in a rotationally symmetric manner and at equal distances from the center of rotational symmetry (not shown). In the following description, this arrangement is referred to as "rotationally symmetrical arrangement".

As described above, according to the first example embodiment, the calibration control apparatus 30 calibrates the characteristic difference between the reception units 23 in the plurality of reception units 23 including the plurality of respective reception antenna elements 21A of the OAM mode multiplex reception apparatus 20. The plurality of reception antenna elements 21A are aligned in a rotationally symmetric manner and at equal distances from the center of rotational symmetry in the OAM mode multiplex reception apparatus 20. The OAM mode multiplex reception apparatus 20 receives a signal transmitted from the OAM mode multiplex transmission apparatus 10 including the plurality of transmission units 13 including the plurality of respective transmission antenna elements 11A arranged in a rotationally symmetric manner and at equal distances from the center of rotation symmetry. Then the calibration control apparatus 30 includes the receiving-side correction coefficient calculation unit 31. The receiving-side correction coefficient calculation unit 31 calculates the receiving-side correction coefficient for calibrating the characteristic difference between the reception units 23 based on the propagation path estimation matrix having, as a matrix element, a propagation path estimation value of each propagation path from the transmission units 13 to the reception units 23 in the plurality of transmission units 13 and the plurality of reception units 23.

According to the configuration of the calibration control apparatus 30, it is possible to calculate the receiving-side correction coefficient based on the propagation path estimation value having, as a matrix element, the propagation path estimation value between the plurality of transmission units 13 of the OAM mode multiplex transmission apparatus 10 and the plurality of reception units 23 of the OAM mode multiplex reception apparatus 20 that are opposed to each other. Accordingly, it is possible to improve the accuracy of calibration of the plurality of reception antenna elements 21A (i.e., array antenna) used for the OAM mode multiplex transmission.

Second Example Embodiment

<Configuration Example of OAM Mode Multiplex Transmission Apparatus>

Figure 4:
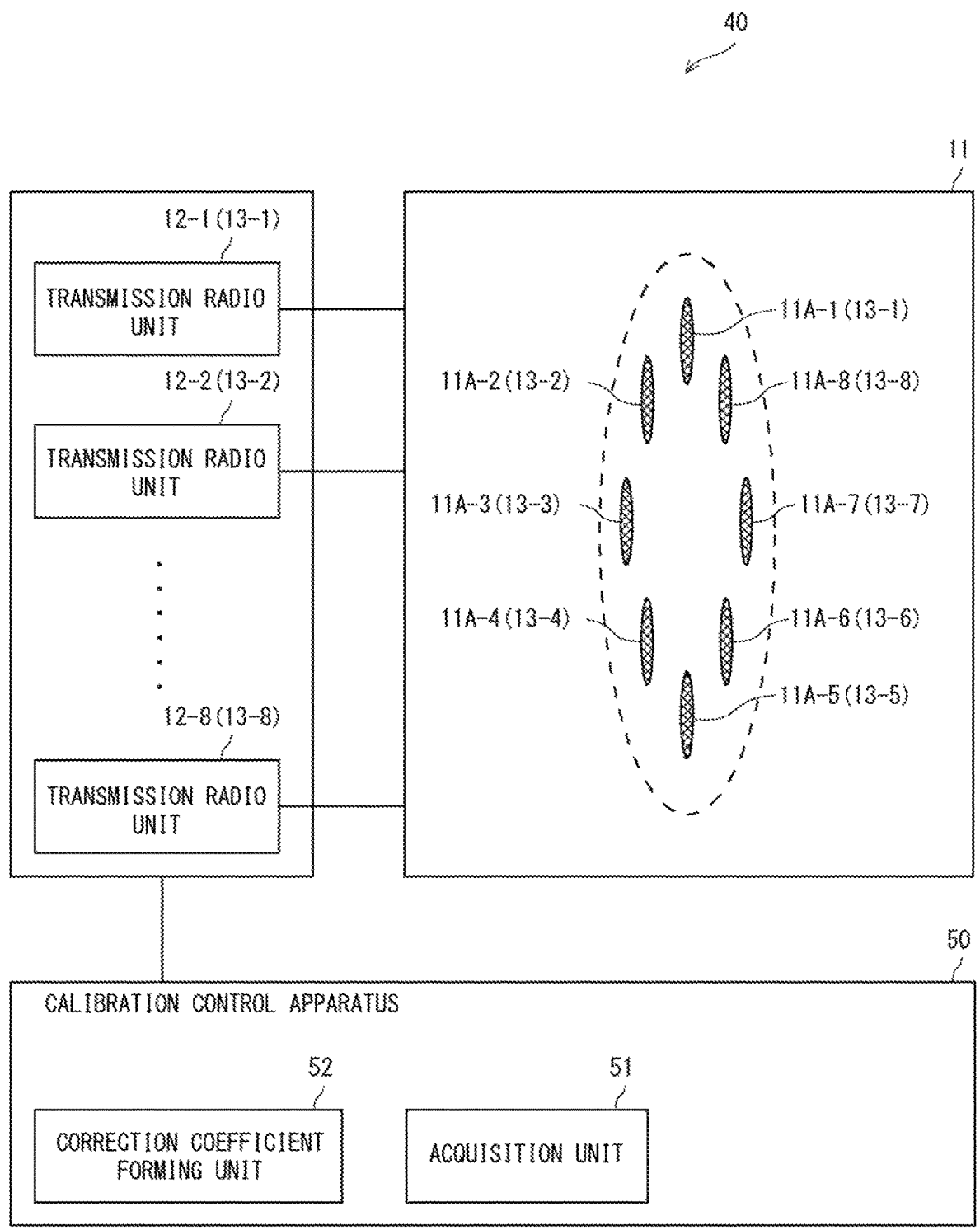
FIG. 4 is a block diagram showing one example of an OAM mode multiplex transmission apparatus according to a second example embodiment.

FIG. 4 is a block diagram showing one example of an OAM mode multiplex transmission apparatus according to the second example embodiment. In FIG. 4, an OAM mode multiplex transmission apparatus 40 includes a calibration control apparatus 50. The calibration control apparatus 50 includes an acquisition unit 51 and a correction coefficient forming unit 52.

The acquisition unit 51 acquires a feedback signal formed based on the propagation path estimation matrix $H_{rx}$ by the OAM mode multiplex reception apparatus according to the second example embodiment that will be described later.

The correction coefficient forming unit 52 forms a "correction coefficient (i.e., "transmitting-side correction coefficient")" for calibrating the characteristic difference between the transmission units 13 in the OAM mode multiplex transmission apparatus 40 based on the feedback signal acquired by the acquisition unit 51. Then the correction coefficient forming unit 52 outputs the transmitting-side correction coefficient formed for each transmission unit 13 to the corresponding transmission radio unit 12. Then the transmission radio unit 12 corrects the phase and the amplitude of the OAM mode multiplex signal according to the data signal based on the transmitting-side correction coefficient when it transmits a data signal by the OAM mode multiplex transmission. Accordingly, it is possible to achieve OAM mode multiplex transmission which is equivalent to the state in which the features between the transmission units 13 are uniform.

<Configuration Example of Calibration Control Apparatus of OAM Mode Multiplex Reception Apparatus>

Figure 5:
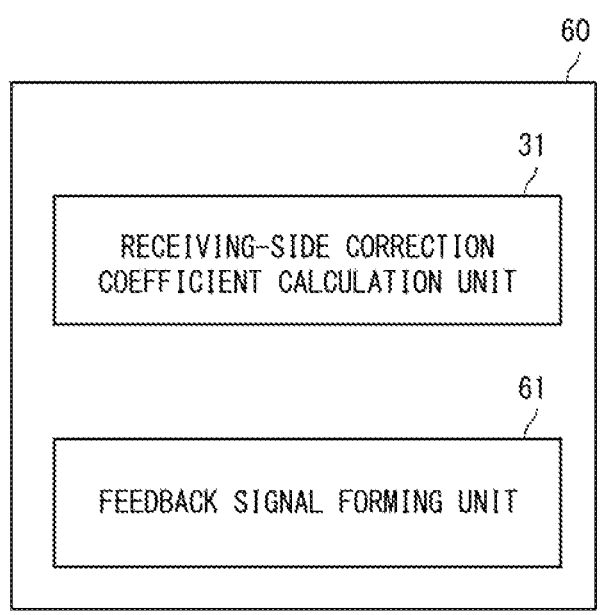
FIG. 5 is a block diagram showing one example of a calibration control apparatus of an OAM mode multiplex reception apparatus according to the second example embodiment.

FIG. 5 is a block diagram showing one example of the calibration control apparatus of the OAM mode multiplex reception apparatus according to the second example embodiment. Since the configurations of the OAM mode multiplex reception apparatus according to the second example embodiment other than the configuration of the calibration control apparatus are the same as those of the OAM mode multiplex reception apparatus 20 according to the first example embodiment, the description will be given with reference to FIG. 3. That is, the OAM mode multiplex reception apparatus 20 according to the second example embodiment includes a calibration control apparatus 60 shown in FIG. 5 in place of the calibration control apparatus 30.

In FIG. 5, the calibration control apparatus 60 includes a feedback signal forming unit 61. The feedback signal forming unit 61 forms a feedback signal to the OAM mode multiplex transmission apparatus 40 based on the propagation path estimation matrix $H_{rx}$. This feedback signal is transmitted to the OAM mode multiplex transmission apparatus 40 by a feedback signal transmission unit (not shown) of the OAM mode multiplex reception apparatus 20 and acquired by the acquisition unit 51.

As described above, according to the second example embodiment, the calibration control apparatus 50 calibrates the characteristic difference between the transmission units 13 in the plurality of transmission units 13 including the plurality of respective transmission antenna elements 11A. Specifically, the acquisition unit 51 of the calibration control apparatus 50 acquires the feedback signal formed by the OAM mode multiplex reception apparatus 20 based on the propagation path estimation matrix having, as a matrix element, a propagation path estimation value of each propagation path from the transmission units 13 to the reception units 23 in the plurality of transmission units 13 and the plurality of reception units 23. Then the correction coefficient forming unit 52 forms the transmitting-side correction coefficient for calibrating the characteristic difference between the transmission units 13 based on the feedback signal acquired in the acquisition unit 51.

With the above calibration control apparatus 50, it is possible to calculate the transmitting-side correction coefficient based on the propagation path estimation matrix having, as a matrix element, a propagation path estimation value between the plurality of transmission units 13 of the OAM mode multiplex transmission apparatus 10 and the plurality of reception units 23 of the OAM mode multiplex reception apparatus 20 that are opposed to each other. Accordingly, it is possible to improve the accuracy of calibration of the plurality of transmission antenna elements 11A (i.e., array antenna) used for the OAM mode multiplex transmission.

Third Example Embodiment

Figure 6:
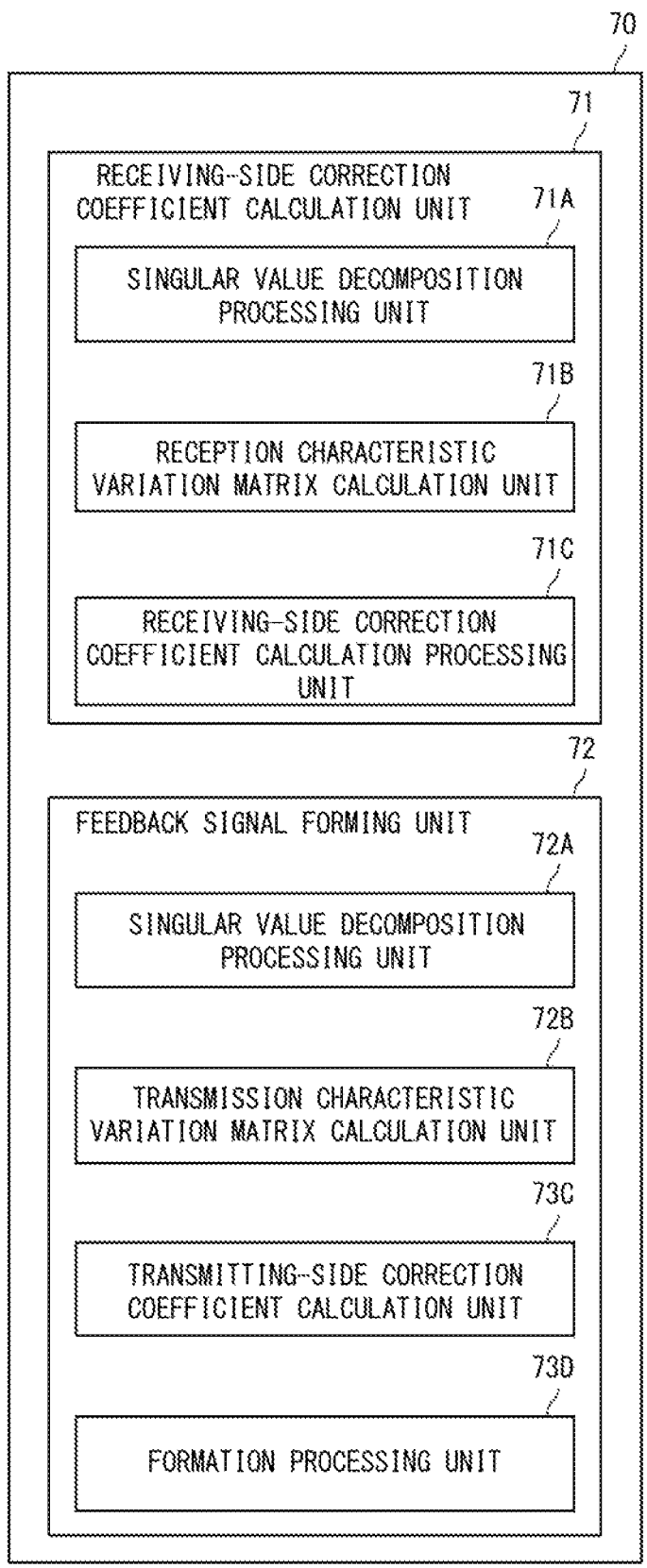
FIG. 6 is a block diagram showing one example of a calibration control apparatus of an OAM mode multiplex reception apparatus according to a third example embodiment.

A third example embodiment relates to a more specific embodiment. Since the main components of an OAM mode multiplex transmission apparatus according to the third example embodiment are the same as those of the OAM mode multiplex transmission apparatus 40 according to the second example embodiment, the description will be given with reference to FIG. 4.
<Configuration Example of Calibration Control Apparatus of OAM Mode Multiplex Reception Apparatus>
FIG. 6 is a block diagram showing one example of a calibration control apparatus of the OAM mode multiplex reception apparatus according to the third example embodiment. Since the configurations of an OAM mode multiplex reception apparatus according to the third example embodiment other than the configuration of the calibration control apparatus are the same as those of the OAM mode multiplex reception apparatus 20 according to the first example embodiment, the description will be given with reference to FIG. 3. That is, the OAM mode multiplex reception apparatus 20 according to the third example embodiment includes a calibration control apparatus 70 shown in FIG. 6 in place of the calibration control apparatus 30.

In FIG. 6, the calibration control apparatus 70 includes a receiving-side correction coefficient calculation unit 71 and a feedback signal forming unit 72. The receiving-side correction coefficient calculation unit 71 includes a singular value decomposition processing unit 71A, a reception characteristic variation matrix calculation unit 71B, and a receiving-side correction coefficient calculation processing unit 71C. Further, the feedback signal forming unit 72 includes a singular value decomposition processing unit 72A, a transmission characteristic variation matrix calculation unit 72B, a transmitting-side correction coefficient calculation unit 73C, and a formation processing unit 73D. While the singular value decomposition processing unit 71A and the singular value decomposition processing unit 72A are shown by blocks different from each other for the sake of convenience, they may be one function unit since the singular value decomposition processing unit 71A and the singular value decomposition processing unit 72A perform the same processing.

The singular value decomposition processing unit 71A executes the singular value decomposition on the propagation path estimation matrix $H_{rx}$ obtained by the propagation path estimation unit 24. That is, the singular value decomposition processing unit 71A calculates a left singular vector matrix U, an eigenvalue matrix D, and a right singular vector matrix $V^{-1}$ from the propagation path estimation matrix $H_{rx}$.

The reception characteristic variation matrix calculation unit 71B calculates a "reception characteristic variation matrix $R_{error}$" based on the left singular vector matrix U obtained in the singular value decomposition processing unit 71A. For example, the reception characteristic variation matrix calculation unit 71B calculates the reception characteristic variation matrix $R_{error}$ by multiplying the left singular vector matrix U by the inverse matrix of a discrete Fourier transform matrix W. The reception characteristic variation matrix $R_{error}$, which is a matrix regarding the characteristic variation between the reception units 23, is a diagonal matrix. That is, the matrix element that appears in diagonals of the reception characteristic variation matrix $R_{error}$ (i.e., "diagonal matrix element") indicates the features of each of the reception units 23.

The receiving-side correction coefficient calculation processing unit 71C calculates the "receiving-side correction coefficient" based on the reception characteristic variation matrix $R_{error}$ calculated in the reception characteristic variation matrix calculation unit 71B. For example, the receiving-side correction coefficient calculation processing unit 71C calculates the ratio of the matrix element that corresponds to the "reference reception unit" to the matrix element that corresponds to each target reception unit including the reference reception unit in the reception characteristic variation matrix $R_{error}$ and calculates the receiving-side correction coefficients that correspond to the respective target reception units. The "reference reception unit" here is one of the reception units 23-1 to 23-8 and the "target reception units" indicate the respective reception units 23-1 to 23-8. That is, the receiving-side correction coefficient calculation processing unit 71C normalizes the diagonal matrix element of the reception characteristic variation matrix $R_{error}$ by the matrix element that corresponds to the reference reception unit.

The singular value decomposition processing unit 72A executes the singular value decomposition on the propagation path estimation matrix $H_{rx}$ obtained by the propagation path estimation unit 24, like in the singular value decomposition processing unit 71A.

The transmission characteristic variation matrix calculation unit 72B calculates a "transmission characteristic variation matrix $T_{error}$" based on the right singular vector matrix $V^{-1}$ obtained in the singular value decomposition processing unit 72A. For example, the transmission characteristic variation matrix calculation unit 72B calculates the transmission characteristic variation matrix $T_{error}$ by multiplying the discrete Fourier transform matrix by an inverse matrix (i.e., V) of the right singular vector matrix $V^{-1}$. The transmission characteristic variation matrix $T_{error}$, which is a matrix regarding the characteristic variation between the transmission units 13, is a diagonal matrix. That is, the matrix element that appears in diagonals of the transmission characteristic variation matrix $T_{error}$ indicates the features of each of the transmission units 13.

The transmitting-side correction coefficient calculation unit 73C calculates the "transmitting-side correction coefficient" based on the transmission characteristic variation matrix $T_{error}$ obtained in the transmission characteristic variation matrix calculation unit 72B. The transmitting-side correction coefficient calculation unit 73C calculates the ratio of the matrix element that corresponds to the "reference transmission unit" to the matrix element that corresponds to each target transmission unit including the reference transmission unit in the transmission characteristic variation matrix $T_{error}$ and calculates the transmitting-side correction coefficients that correspond to the respective target transmission units. The "reference transmission unit" here indicates one of the transmission units 13-1 to 13-8 and the "target transmission units" are the respective transmission units 13-1 to 13-8. That is, the transmitting-side correction coefficient calculation unit 73C normalizes the diagonal matrix element of the transmission characteristic variation matrix $T_{error}$ by the matrix element that corresponds to the reference transmission unit.

The formation processing unit 73D forms a feedback signal including information regarding the transmitting-side correction coefficient calculated in the transmitting-side correction coefficient calculation unit 73C. This feedback signal is transmitted to the OAM mode multiplex transmission apparatus 40 by a feedback signal transmission unit (not shown) of the OAM mode multiplex reception apparatus 20, and is acquired by the acquisition unit 51.

<Processing of Calculating Receiving-Side Correction Coefficient and Transmitting-Side Correction Coefficient>

Now, the processing of calculating the receiving-side correction coefficient and the transmitting-side correction coefficient from the propagation path estimation matrix $H_{rx}$ will be described in detail.

First, the plurality of reception signals output from the reception radio unit 22 of the OAM mode multiplex reception apparatus 20 (i.e., reception signal vectors) can be expressed by the following expression (1).

$$R_{sig} = H_{rx} \cdot T_{sig} \tag{1}$$

Note that $R_{sig}$ is a reception signal vector of the reception signal output from the reception radio unit 22 and $T_{sig}$ is a transmission signal vector input to the transmission radio unit 12.

Then the propagation path estimation matrix $H_{rx}$ can be decomposed by the following expression (2).

$$H_{rx} = R_{error} \cdot H_{MIMO} \cdot T_{error} \tag{2}$$

$H_{MIMO}$ is a propagation path estimation matrix (in the following description, this matrix will be referred to as a "space propagation path estimation matrix") having, as a matrix element, a propagation path estimation value of a propagation path through which the signal radiated from the transmission antenna element 11A passes before reaching the reception antenna element 21A, i.e., a propagation path in the space. Further, $R_{error}$ indicates the reception characteristic variation matrix and $T_{error}$ indicates the transmission characteristic variation matrix.

As described above, the transmission antenna elements 11A-1 to 11A-8 and the reception antenna elements 21A-1 to 21A-8 are each aligned so as to satisfy the "rotationally symmetrical arrangement". Therefore, the space propagation path estimation matrix $H_{MIMO}$ is a circulant matrix. FIG. 7 is a diagram showing one example of the space propagation path estimation matrix $H_{MIMO}$. Therefore, the space propagation path estimation matrix $H_{MIMO}$ can be expressed as shown in the following expression (3).

$$H_{MIMO} = W \cdot D \cdot W^{-1} \tag{3}$$

Note that W denotes a discrete Fourier transform matrix and D denotes a diagonal matrix of an eigenvalue (i.e., eigenvalue matrix).

Therefore, by substituting the expression (3) into the expression (2), the expression (2) can be modified as shown in the following expression (4).

$$H_{rx} = R_{error} \cdot W \cdot D \cdot W^{-1} \cdot T_{error} = (R_{error} W) \cdot D \cdot (W^{-1} \cdot T_{error}) \tag{4}$$

On the other hand, the singular value decomposition of the propagation path estimation matrix $H_{rx}$ can be expressed by the following expression (5). This singular value decomposition is processing executed by the aforementioned singular value decomposition processing unit 71A.

$$H_{rx} = U \cdot D \cdot V^{-1} \tag{5}$$

That is, by comparing the expression (4) with the expression (5), the relational expression shown in the following expressions (6) and (7) can be derived.

$$U = R_{error} \cdot W \tag{6}$$

$$V^{-1} = W^{-1} \cdot T_{error} \tag{7}$$

By deforming the expression (6), the following expression (8) can be obtained.

$$R_{error} = U \cdot W^{-1} \tag{8}$$

Further, by deforming the expression (7), the following expression (9) can be obtained.

$$T_{error} = W \cdot V^{-1} \tag{9}$$

The aforementioned reception characteristic variation matrix calculation unit 71B is able to calculate the reception characteristic variation matrix $R_{error}$ by performing calculation of the aforementioned expression (8). Further, the aforementioned transmission characteristic variation matrix calculation unit 72B is able to calculate the transmission characteristic variation matrix $T_{error}$ by performing calculation of the aforementioned expression (9). FIG. 8 is a diagram showing one example of the transmission characteristic variation matrix $T_{error}$. FIG. 9 is a diagram showing one example of the reception characteristic variation matrix $R_{error}$. In the transmission characteristic variation matrix $T_{error}$ in FIG. 8, diagonal matrix elements $e_{t1}$ to $e_{t18}$ respectively indicate the features of the transmission units 13-1 to 13-8. Further, in the reception characteristic variation matrix $R_{error}$ shown in FIG. 9, diagonal matrix elements $e_{r1}$ to $e_{r18}$ indicate the respective features of the reception units 23-1 to 23-8.

A transmitting-side correction coefficient $w_{TXCALn}$ of each transmission unit 13 can be calculated using the following expression (10). This calculation processing is performed by the aforementioned transmitting-side correction coefficient calculation unit 73C.

$$w_{TXCALn}=e_{t1}/e_{tm} \quad (10)$$

Note that n may have a value from 1 to 8 that respectively correspond to the transmission units 13-1 to 13-8. In this example, the transmission unit 13-1 corresponds to the aforementioned "reference transmission unit".

Further, a receiving-side correction coefficient $w_{RXCALn}$ of each reception unit 23 can be calculated using the following expression (11). This calculation processing is performed by the aforementioned receiving-side correction coefficient calculation processing unit 71C.

$$w_{RXCALm}=e_{r1}/e_{rm} \quad (11)$$

Note that m may have a value from 1 to 8 that respectively correspond to the reception units 23-1 to 23-8. In this example, the reception unit 23-1 corresponds to the aforementioned "reference reception unit".

As described above, according to the third example embodiment, in the calibration control apparatus 70 of the OAM mode multiplex reception apparatus 20, the receiving-side correction coefficient calculation unit 71 includes the reception characteristic variation matrix calculation unit 71B and the receiving-side correction coefficient calculation processing unit 71C. The reception characteristic variation matrix calculation unit 71B calculates the reception characteristic variation matrix $R_{error}$ that relates to the characteristic variation between the reception units 23 and is a diagonal matrix based on the left singular vector matrix U obtained by executing the singular value decomposition on the propagation path estimation matrix $H_{rx}$. Then the receiving-side correction coefficient calculation processing unit 71C calculates the "receiving-side correction coefficient" based on the reception characteristic variation matrix $R_{error}$ calculated in the reception characteristic variation matrix calculation unit 71B.

Specifically, the reception characteristic variation matrix calculation unit 71B calculates the reception characteristic variation matrix $R_{error}$ by multiplying the left singular vector matrix U by the inverse matrix of the discrete Fourier transform matrix W.

According to the configuration of the calibration control apparatus 70, the reception characteristic variation matrix $R_{error}$ can be easily calculated using the fact that the propagation path estimation matrix $H_{rx}$ becomes a circulant matrix due to the fact that the plurality of transmission antenna elements 11A and the plurality of reception antenna elements 21A are each arranged in a "rotationally symmetrical manner".

Further, the receiving-side correction coefficient calculation processing unit 71C calculates the ratio of the matrix element that corresponds to the "reference reception unit" to the matrix element that corresponds to each target reception unit including the reference reception unit in the reception characteristic variation matrix $R_{error}$ and calculates the receiving-side correction coefficient that corresponds to each target reception unit.

According to the configuration of the calibration control apparatus 70, by only normalizing the reception characteristic variation matrix $R_{error}$, the receiving-side correction coefficient can be easily calculated.

Further, in the calibration control apparatus 70 of the OAM mode multiplex reception apparatus 20, the feedback signal forming unit 72 includes the transmission characteristic variation matrix calculation unit 72B, the transmitting-side correction coefficient calculation unit 73C, and the formation processing unit 73D. The transmission characteristic variation matrix calculation unit 72B calculates the transmission characteristic variation matrix $T_{error}$ which relates to the characteristic variation between the transmission units 13 and is a diagonal matrix based on the right singular vector matrix V' obtained by executing the singular value decomposition on the propagation path estimation matrix $H_{rx}$. The transmitting-side correction coefficient calculation unit 73C calculates the transmitting-side correction coefficient for calibrating the characteristic difference between the transmission units 13 based on the calculated transmission characteristic variation matrix $T_{error}$. The formation processing unit 73D forms a feedback signal including information regarding the transmitting-side correction coefficient calculated in the transmitting-side correction coefficient calculation unit 73C.

Specifically, the transmission characteristic variation matrix calculation unit 72B calculates the transmission characteristic variation matrix $T_{error}$ by multiplying the discrete Fourier transform matrix W by the inverse matrix of the right singular vector matrix $V^{-1}$.

According to the configuration of the calibration control apparatus 70, the transmission characteristic variation matrix $T_{error}$ can be easily calculated using the fact that the propagation path estimation matrix $H_{rx}$ becomes a circulant matrix due to the fact that the plurality of transmission antenna elements 11A and the plurality of reception antenna elements 21A are each arranged in a "rotationally symmetrical manner".

Further, the transmitting-side correction coefficient calculation unit 73C calculates the ratio of the matrix element that corresponds to the "reference transmission unit" to the matrix element that corresponds to each target transmission unit including the reference transmission unit in the transmission characteristic variation matrix $T_{error}$ and calculates the transmitting-side correction coefficient that corresponds to each target transmission unit.

According to the configuration of the calibration control apparatus 70, the transmitting-side correction coefficient can be easily calculated by only normalizing the transmission characteristic variation matrix $T_{error}$.

Fourth Example Embodiment

In a fourth example embodiment, unlike the third example embodiment, the calibration control apparatus on the side of the OAM mode multiplex reception apparatus calculates the transmission characteristic variation matrix $T_{error}$ and feeds back this information to the OAM mode multiplex transmission apparatus. Then the calibration control apparatus on the side of the OAM mode multiplex transmission apparatus calculates the transmitting-side correction coefficient from the transmission characteristic variation matrix $T_{error}$.

<Configuration Example of Calibration Control Apparatus of OAM Mode Multiplex Reception Apparatus>

Figure 10:
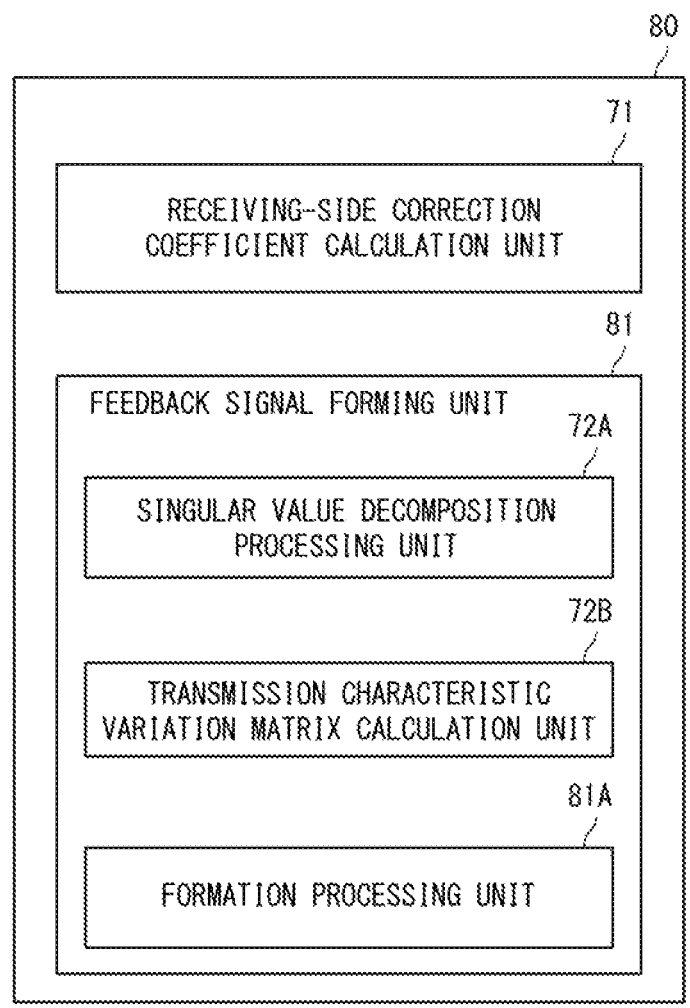
FIG. 10 is a block diagram showing one example of a calibration control apparatus of an OAM mode multiplex reception apparatus according to a fourth example embodiment.

FIG. 10 is a block diagram showing one example of the calibration control apparatus of the OAM mode multiplex reception apparatus according to the fourth example embodiment. Since the configurations of the OAM mode multiplex reception apparatus according to the fourth example embodiment other than the configuration of the calibration control apparatus are the same as those of the OAM mode multiplex reception apparatus 20 according to the first example embodiment, the description will be given with reference to FIG. 3.

In FIG. 10, a calibration control apparatus 80 of the OAM mode multiplex reception apparatus 20 includes a feedback signal forming unit 81. The feedback signal forming unit 81 includes a formation processing unit 81A.

The formation processing unit 81A forms a feedback signal including the information regarding the transmission characteristic variation matrix $T_{error}$ based on the transmission characteristic variation matrix $T_{error}$ obtained in the transmission characteristic variation matrix calculation unit 72B. This feedback signal is transmitted to the OAM mode multiplex transmission apparatus 40 by a feedback signal transmission unit (not shown) of the OAM mode multiplex reception apparatus 20 and is acquired by the acquisition unit 51.

<Configuration Example of Calibration Control Apparatus of OAM Mode Multiplex Transmission Apparatus>

Figure 11:
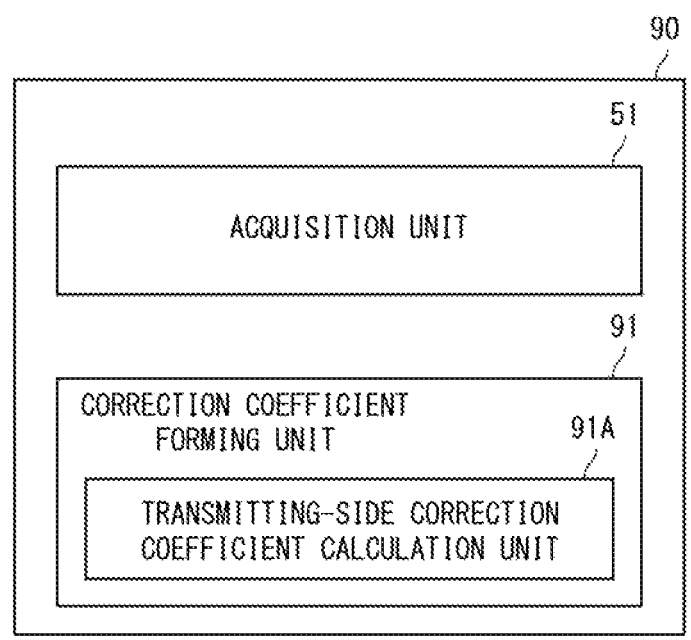
FIG. 11 is a block diagram showing one example of a calibration control apparatus of an OAM mode multiplex transmission apparatus according to the fourth example embodiment.

FIG. 11 is a block diagram showing one example of the calibration control apparatus of the OAM mode multiplex transmission apparatus according to the fourth example embodiment. Since the configurations of the OAM mode multiplex transmission apparatus according to the fourth example embodiment other than the configuration of the calibration control apparatus are the same as those of the OAM mode multiplex transmission apparatus 40 according to the second example embodiment, the description will be given with reference to FIG. 4.

In FIG. 11, a calibration control apparatus 90 of the OAM mode multiplex transmission apparatus 40 includes a correction coefficient forming unit 91. The correction coefficient forming unit 91 includes a transmitting-side correction coefficient calculation unit 91A.

The transmitting-side correction coefficient calculation unit 91A calculates the "transmitting-side correction coefficient" using the information regarding the transmission characteristic variation matrix $T_{error}$ included in the feedback signal acquired by the acquisition unit 51. This calculation processing is similar to that in the transmitting-side correction coefficient calculation unit 73C according to the third example embodiment.

As described above, according to the fourth example embodiment, in the calibration control apparatus 80 of the OAM mode multiplex reception apparatus 20, the formation processing unit 81A forms a feedback signal including the information regarding the transmission characteristic variation matrix $T_{error}$ based on the transmission characteristic variation matrix $T_{error}$ obtained in the transmission characteristic variation matrix calculation unit 72B.

Further, in the calibration control apparatus 90 of the OAM mode multiplex transmission apparatus 40, the transmitting-side correction coefficient calculation unit 91A calculates the "transmitting-side correction coefficient" using the information regarding the transmission characteristic variation matrix $T_{error}$ included in the feedback signal acquired by the acquisition unit 51.

With the configurations of the calibration control apparatus 80 and the calibration control apparatus 90, the calculation of the transmission characteristic variation matrix $T_{error}$ and the calculation of the transmitting-side correction coefficient can be shared by the calibration control apparatus 80 and the calibration control apparatus 90. Accordingly, it is possible to equalize the processing amount that relates to the calculation of the transmission characteristic variation matrix $T_{error}$ and the calculation of the transmitting-side correction coefficient between the calibration control apparatus 80 and the calibration control apparatus 90.

Fifth Example Embodiment

In a fifth example embodiment, unlike the third example embodiment, the calibration control apparatus on the side of the OAM mode multiplex reception apparatus calculates the right singular vector matrix $V^{-1}$ and feeds back this information to the OAM mode multiplex transmission apparatus. Then the calibration control apparatus on the side of the OAM mode multiplex transmission apparatus calculates the transmission characteristic variation matrix $T_{error}$ and the transmitting-side correction coefficient from the right singular vector matrix V'.

<Configuration Example of Calibration Control Apparatus of OAM Mode Multiplex Reception Apparatus>

Figure 12:
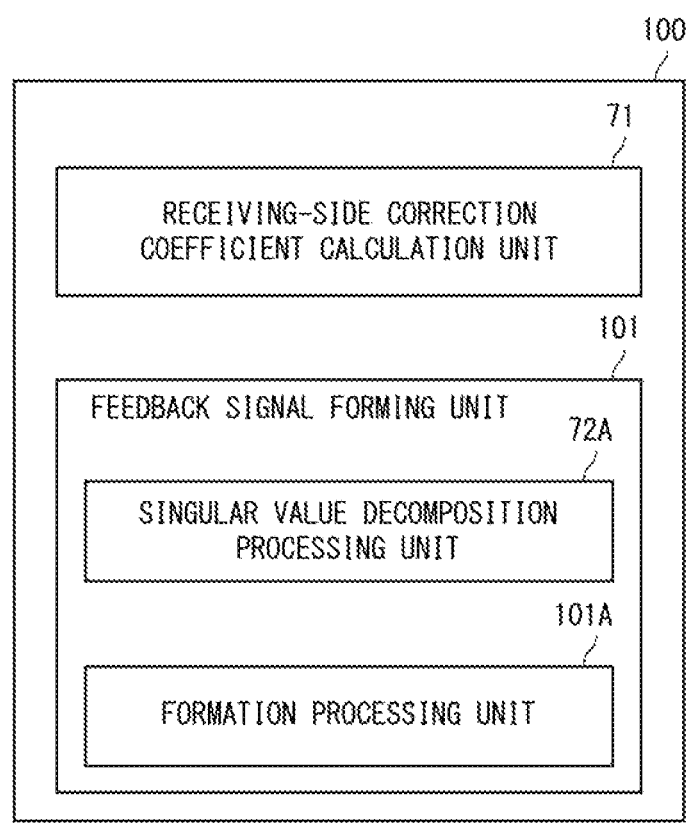
FIG. 12 is a block diagram showing one example of a calibration control apparatus of an OAM mode multiplex reception apparatus according to a fifth example embodiment.

FIG. 12 is a block diagram showing one example of the calibration control apparatus of the OAM mode multiplex reception apparatus according to the fifth example embodiment. Since the configurations of the OAM mode multiplex reception apparatus according to the fifth example embodiment other than the configuration of the calibration control apparatus are the same as those of the OAM mode multiplex reception apparatus 20 according to the first example embodiment, the description will be given with reference to FIG. 3.

In FIG. 12, a calibration control apparatus 100 of the OAM mode multiplex reception apparatus 20 includes a feedback signal forming unit 101. The feedback signal forming unit 101 includes a formation processing unit 101A.

The formation processing unit 101A forms a feedback signal including information regarding the right singular vector matrix $V^{-1}$ based on the right singular vector matrix $V^{-1}$ obtained in the singular value decomposition processing unit 72A. This feedback signal is transmitted to the OAM mode multiplex transmission apparatus 40 by a feedback signal transmission unit (not shown) of the OAM mode multiplex reception apparatus 20 and acquired by the acquisition unit 51.

<Configuration Example of Calibration Control Apparatus of OAM Mode Multiplex Transmission Apparatus>

Figure 13:
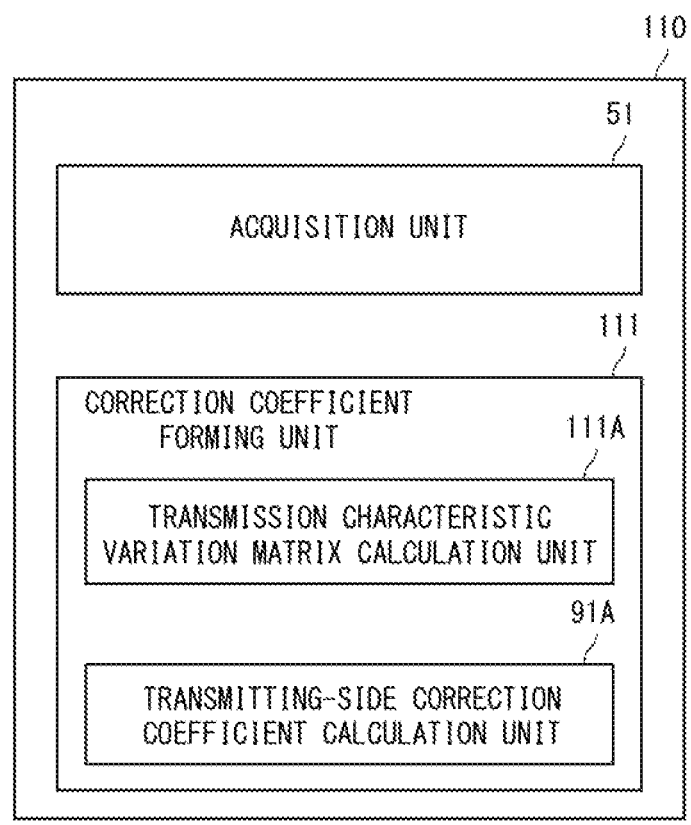
FIG. 13 is a block diagram showing one example of a calibration control apparatus of an OAM mode multiplex transmission apparatus according to the fifth example embodiment.

FIG. 13 is a block diagram showing one example of the calibration control apparatus of the OAM mode multiplex transmission apparatus according to the fifth example embodiment. Since the configurations of the OAM mode multiplex transmission apparatus according to the fifth example embodiment other than the configuration of the calibration control apparatus are the same as those of the OAM mode multiplex transmission apparatus 40 according to the second example embodiment, the description will be given with reference to FIG. 4.

In FIG. 13, a calibration control apparatus 110 of the OAM mode multiplex transmission apparatus 40 includes a correction coefficient forming unit 111. The correction coefficient forming unit 111 includes a transmission characteristic variation matrix calculation unit 111A.

The transmission characteristic variation matrix calculation unit 111A calculates the transmission characteristic variation matrix $T_{error}$ using the information regarding the right singular vector matrix $V^{-1}$ included in the feedback signal acquired by the acquisition unit 51, like in the transmission characteristic variation matrix calculation unit 72B according to the third example embodiment. Then, in the calibration control apparatus 110 according to the fifth example embodiment, the transmitting-side correction coefficient calculation unit 91A calculates the transmitting-side correction coefficient using the transmission characteristic variation matrix $T_{error}$ obtained in the transmission characteristic variation matrix calculation unit 111A.

As described above, according to the fifth example embodiment, in the calibration control apparatus 100 of the OAM mode multiplex reception apparatus 20, the formation processing unit 101A forms the feedback signal including information regarding the right singular vector matrix $V^{-1}$ based on the right singular vector matrix $V^{-1}$ obtained in the singular value decomposition processing unit 72A.

Further, in the calibration control apparatus 110 of the OAM mode multiplex transmission apparatus 40, the transmission characteristic variation matrix calculation unit 111A calculates the transmission characteristic variation matrix $T_{error}$ using the information regarding the right singular vector matrix $V^{-1}$ included in the feedback signal acquired by the acquisition unit 51. Then the transmitting-side correction coefficient calculation unit 91A calculates the transmitting-side correction coefficient using the transmission characteristic variation matrix $T_{error}$ obtained in the transmission characteristic variation matrix calculation unit 111A.

With the configurations of the calibration control apparatus 100 and the calibration control apparatus 110, the calculation of the receiving-side correction coefficient and the calculation of the transmitting-side correction coefficient may be shared between the calibration control apparatus 100 and the calibration control apparatus 110. Accordingly, it is possible to equalize the processing amount that relates to the calculation of the receiving-side correction coefficient and the calculation of the transmitting-side correction coefficient between the calibration control apparatus 100 and the calibration control apparatus 110.

Other Example Embodiments

Figure 14:
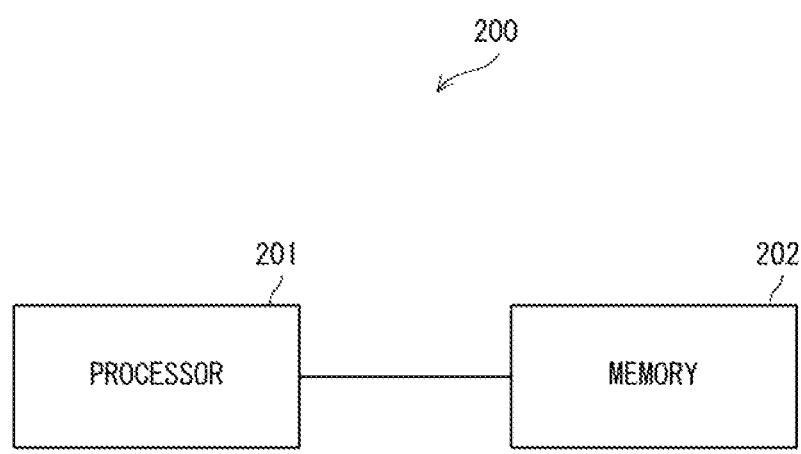
FIG. 14 is a diagram showing a hardware configuration example of a calibration control apparatus.

<1> The transmitting-side calibration control apparatuses 50, 90, and 110 and the receiving-side calibration control apparatuses 30, 60, 70, 80, and 100 described in the first to fifth example embodiments are able to form a calibration system.
<2> While the transmitting-side calibration control apparatuses 50, 90, and 110 and the receiving-side calibration control apparatuses 30, 60, 70, 80, and 100 described in the first to fifth example embodiments are respectively included in the transmission apparatus and the reception apparatus in the aforementioned description, this is merely an example. The transmitting-side calibration control apparatuses 50, 90, and 110 and the receiving-side calibration control apparatuses 30, 60, 70, 80, and 100 may be apparatuses other than the transmission apparatus and the reception apparatus.
<3> FIG. 14 is a diagram showing a hardware configuration example of the calibration control apparatus. In FIG. 14, a calibration control apparatus 200 includes a processor 201 and a memory 202. Each of the transmitting-side calibration control apparatuses 50, 90, and 110 and the receiving-side calibration control apparatuses 30, 60, 70, 80, and 100 described in the first to fifth example embodiments may include the hardware configuration shown in FIG. 14. The receiving-side correction coefficient calculation units 31 and 71 and the feedback signal forming units 61, 72, 81, and 101 of the receiving-side calibration control apparatuses 30, 60, 70, 80, and 100 described in the first to fifth example embodiments may be achieved by the processor 201 loading a program stored in the memory 202 and executing the loaded program. Further, the acquisition unit 51 and the correction coefficient forming units 52, 91, and 111 of the transmitting-side calibration control apparatuses 50, 90, and 110 described in the first to fifth example embodiments may be achieved by the processor 201 loading a program stored in the memory 202 and executing the loaded program. The program may be stored using various types of non-transitory computer readable media and may be supplied to the transmitting-side calibration control apparatuses 50, 90, and 110 and the receiving-side calibration control apparatuses 30, 60, 70, 80, and 100. Further, the program may be supplied to the transmitting-side calibration control apparatuses 50, 90, and 110 and the receiving-side calibration control apparatuses 30, 60, 70, 80, and 100 by various types of transitory computer readable media.

While the present application has been described with reference to the example embodiments, the present disclosure is not limited to these example embodiments. Various changes that may be understood by those skilled in the art may be made to the configuration and the details of the present disclosure within the scope of the present disclosure.

The whole or part of the example embodiments disclosed above can be described as, but not limited to, the following supplementary notes.
(Supplementary Note 1)

A calibration control apparatus configured to calibrate a characteristic difference between reception units in a plurality of reception units, the plurality of reception units receiving a signal transmitted from an orbital angular momentum (OAM) mode multiplex transmission apparatus comprising a plurality of transmission units including a plurality of respective transmission antenna elements arranged in a rotationally symmetric manner and at equal distances from the center of rotation symmetry, the plurality of reception units further comprising a plurality of respective reception antenna elements arranged in a rotationally symmetric manner and at equal distances from the center of rotation symmetry in an OAM mode multiplex reception apparatus that is separated from the OAM mode multiplex transmission apparatus, the calibration control apparatus comprising:

a receiving-side correction coefficient calculation unit configured to calculate a receiving-side correction coefficient for calibrating the characteristic difference between the reception units based on a propagation path estimation matrix that has, as a matrix element, a propagation path estimation value of each propagation path from the transmission units to the reception units in the plurality of transmission units and the plurality of reception units.
(Supplementary Note 2)

The calibration control apparatus according to Supplementary Note 1, wherein the receiving-side correction coefficient calculation unit comprises:

a reception characteristic variation matrix calculation unit configured to calculate, based on a left singular vector matrix obtained by executing singular value decomposition on the propagation path estimation matrix, a reception characteristic variation matrix that relates to a characteristic variation between the reception units and is a diagonal matrix; and a receiving-side correction coefficient calculation processing unit configured to calculate, based on the calculated reception characteristic variation matrix, a receiving-side correction coefficient for calibrating the characteristic difference between the reception units.
(Supplementary Note 3)

The calibration control apparatus according to Supplementary Note 2, comprising a feedback signal forming unit configured to form, based on the propagation path estimation matrix, a feedback signal to the OAM mode multiplex transmission apparatus, the feedback signal being used to form a transmitting-side correction coefficient for calibrating a characteristic difference between transmission units in the OAM mode multiplex transmission apparatus.

(Supplementary Note 4)

The calibration control apparatus according to Supplementary Note 3, wherein the feedback signal forming unit forms based on a right singular vector matrix obtained by executing singular value decomposition on the propagation path estimation matrix, a feedback signal to the OAM mode multiplex transmission apparatus, the feedback signal being used to form a transmitting-side correction coefficient for calibrating a characteristic difference between transmission units in the OAM mode multiplex transmission apparatus.

(Supplementary Note 5)

The calibration control apparatus according to Supplementary Note 4, wherein the feedback signal forming unit comprises:

a transmission characteristic variation matrix calculation unit configured to calculate, based on the right singular vector matrix, a transmission characteristic variation matrix that relates to the characteristic variation between the transmission units and is a diagonal matrix;

a transmitting-side correction coefficient calculation unit configured to calculate, based on the calculated transmission characteristic variation matrix, a transmitting-side correction coefficient for calibrating a characteristic difference between the transmission units; and a formation processing unit configured to form the feedback signal including information regarding the calculated transmitting-side correction coefficient.

(Supplementary Note 6)

The calibration control apparatus according to Supplementary Note 5, wherein the transmitting-side correction coefficient calculation unit calculates a transmitting-side correction coefficient that corresponds to each target transmission unit by calculating a ratio of a matrix element that corresponds to a reference transmission unit in the calculated transmission characteristic variation matrix to a matrix element that corresponds to the each target transmission unit including the reference transmission unit.

(Supplementary Note 7)

The calibration control apparatus according to Supplementary Note 4, wherein the feedback signal forming unit comprises:

a transmission characteristic variation matrix calculation unit configured to calculate, based on the right singular vector matrix, a transmission characteristic variation matrix regarding a characteristic variation between the transmission units; and a formation processing unit configured to form the feedback signal including information regarding the calculated transmission characteristic variation matrix.

(Supplementary Note 8)

The calibration control apparatus according to Supplementary Note 5 or 7, wherein the transmission characteristic variation matrix calculation unit calculates the transmission characteristic variation matrix by multiplying a discrete Fourier transform matrix by an inverse matrix of the right singular vector matrix.

(Supplementary Note 9)

The calibration control apparatus according to Supplementary Note 4, wherein the feedback signal forming unit forms the feedback signal including information regarding the right singular vector matrix.

(Supplementary Note 10)

The calibration control apparatus according to any one of Supplementary Notes 2 to 9, wherein the reception characteristic variation matrix calculation unit calculates the reception characteristic variation matrix by multiplying the left singular vector matrix by an inverse matrix of a discrete Fourier transform matrix.

(Supplementary Note 11)

The calibration control apparatus according to Supplementary Note 10, wherein the receiving-side correction coefficient calculation processing unit calculates a receiving-side correction coefficient that corresponds to each target reception unit by calculating a ratio of a matrix element that corresponds to a reference reception unit in the calculated reception characteristic variation matrix to a matrix element that corresponds to the each target reception unit including the reference reception unit.

(Supplementary Note 12)

A calibration control apparatus configured to calibrate a characteristic difference between transmission units in a plurality of transmission units, the plurality of transmission units transmitting an OAM mode multiplex signal to an OAM mode multiplex reception apparatus comprising a plurality of reception units including a plurality of respective reception antenna elements arranged in a rotationally symmetric manner and at equal distances from the center of rotation symmetry, the plurality of transmission units further comprising a plurality of transmission antenna elements arranged in a rotationally symmetric manner and at equal distances from the center of rotation symmetry in an OAM mode multiplex transmission apparatus that is separated from the OAM mode multiplex reception apparatus, the calibration control apparatus comprising:

an acquisition unit configured to acquire a feedback signal formed by the OAM mode multiplex reception apparatus based on a propagation path estimation matrix that has, as a matrix element, a propagation path estimation value of each propagation path from the transmission units to the reception units in the plurality of transmission units and the plurality of reception units; and a correction coefficient forming unit configured to form, based on the acquired feedback signal, a transmitting-side correction coefficient for calibrating a characteristic difference between the transmission units in the OAM mode multiplex transmission apparatus.

(Supplementary Note 13)

The calibration control apparatus according to Supplementary Note 12, wherein the acquisition unit acquires the feedback signal formed by the OAM mode multiplex reception apparatus based on a right singular vector matrix obtained by executing singular value decomposition on the propagation path estimation matrix.

(Supplementary Note 14)

The calibration control apparatus according to Supplementary Note 13, wherein the acquisition unit acquires the feedback signal including information regarding a transmission characteristic variation matrix that relates to a characteristic variation between the transmission units and is a diagonal matrix, the characteristic variation between the transmission units being calculated based on the right singular vector matrix in the OAM mode multiplex reception apparatus, and the correction coefficient forming unit comprises a transmitting-side correction coefficient calculation unit that calculates a transmitting-side correction coefficient that corresponds to each target transmission unit by calculating a ratio of a matrix element that corresponds to a reference transmission unit in the transmission characteristic variation matrix to a matrix element that corresponds to the each target transmission unit including the reference transmission unit.

(Supplementary Note 15)

The calibration control apparatus according to Supplementary Note 13, wherein the acquisition unit acquires the feedback signal including information regarding the right singular vector matrix, and the correction coefficient forming unit comprises:

a transmission characteristic variation matrix calculation unit configured to calculate, based on the right singular vector matrix, a transmission characteristic variation matrix that relates to a characteristic variation between the transmission units and is a diagonal matrix; and a transmitting-side correction coefficient calculation unit configured to calculate, based on the calculated transmission characteristic variation matrix, a transmitting-side correction coefficient for calibrating a characteristic difference between the transmission units.

(Supplementary Note 16)

The calibration control apparatus according to Supplementary Note 15, wherein the transmission characteristic variation matrix calculation unit calculates the transmission characteristic variation matrix by multiplying the right singular vector matrix by an inverse matrix of a discrete Fourier transform matrix.

(Supplementary Note 17)

A calibration control method for calibrating a characteristic difference between reception units in a plurality of reception units including a plurality of respective reception antenna elements arranged in a rotationally symmetric manner and at equal distances from the center of rotation symmetry in an OAM mode multiplex reception apparatus configured to receive a signal transmitted from an OAM mode multiplex transmission apparatus comprising a plurality of transmission units including a plurality of respective transmission antenna elements arranged in a rotationally symmetric manner and at equal distances from the center of rotation symmetry, the calibration control method comprising:

calculating a reception characteristic variation matrix regarding a characteristic variation between the reception units based on a propagation path estimation matrix that has, as a matrix element, a propagation path estimation value of each propagation path from the transmission units to the reception units in the plurality of transmission units and the plurality of reception units.

(Supplementary Note 18)

A calibration control method for calibrating a characteristic difference between transmission units in a plurality of transmission units comprising a plurality of respective transmission antenna elements arranged in a rotationally symmetric manner and at equal distances from the center of rotation symmetry in an OAM mode multiplex transmission apparatus, the OAM mode multiplex transmission apparatus transmitting an OAM mode multiplex signal to an OAM mode multiplex reception apparatus comprising a plurality of reception units including a plurality of respective reception antenna elements arranged in a rotationally symmetric manner and at equal distances from the center of rotation symmetry, the calibration control method comprising:

acquiring a feedback signal formed by the OAM mode multiplex reception apparatus based on a propagation path estimation matrix that has, as a matrix element, a propagation path estimation value of each propagation path from the transmission units to the reception units in the plurality of transmission units and the plurality of reception units; and forming a transmitting-side correction coefficient for calibrating, based on the acquired feedback signal, a characteristic difference between transmission units in the OAM mode multiplex transmission apparatus.

(Supplementary Note 19)

A calibration control program for causing a calibration control apparatus configured to calibrate a characteristic difference between reception units in a plurality of reception units, the plurality of reception units receiving a signal transmitted from an orbital angular momentum (OAM) mode multiplex transmission apparatus comprising a plurality of transmission units including a plurality of respective transmission antenna elements arranged in a rotationally symmetric manner and at equal distances from the center of rotation symmetry, the plurality of reception units further comprising a plurality of respective reception antenna elements arranged in a rotationally symmetric manner and at equal distances from the center of rotation symmetry in an OAM mode multiplex reception apparatus that is separated from the OAM mode multiplex transmission apparatus to execute the following processing of:

calculating a receiving-side correction coefficient for calibrating the characteristic difference between the reception units based on a propagation path estimation matrix that has, as a matrix element, a propagation path estimation value of each propagation path from the transmission units to the reception units in the plurality of transmission units and the plurality of reception units.

(Supplementary Note 20)

A calibration control program for causing a calibration control apparatus configured to calibrate a characteristic difference between transmission units in a plurality of transmission units, the plurality of transmission units transmitting an OAM mode multiplex signal to an OAM mode multiplex reception apparatus comprising a plurality of reception units including a plurality of respective reception antenna elements arranged in a rotationally symmetric manner and at equal distances from the center of rotation symmetry, the plurality of transmission units comprising a plurality of respective transmission antenna elements arranged in a rotationally symmetric manner and at equal distances from the center of rotation symmetry in an OAM mode multiplex transmission apparatus that is separated from the OAM mode multiplex reception apparatus to execute the following processing of:

acquiring a feedback signal formed by the OAM mode multiplex reception apparatus based on a propagation path estimation matrix that has, as a matrix element, a propagation path estimation value of each propagation path from the transmission units to the reception units in the plurality of transmission units and the plurality of reception units; and forming, based on the acquired feedback signal, a transmitting-side correction coefficient for calibrating a characteristic difference between the transmission units in the OAM mode multiplex transmission apparatus.

(Supplementary Note 21)

A calibration system for calibrating a characteristic difference between transmission units in a plurality of transmission units including a plurality of respective transmission antenna elements arranged in a rotationally symmetric manner and at equal distances from the center of rotation symmetry in an OAM mode multiplex transmission apparatus and a characteristic difference between reception units in a plurality of reception units, the plurality of reception units receiving signals transmitted from the OAM mode multiplex transmission apparatus and including a plurality of respective reception antenna elements arranged in a rotationally symmetric manner and at equal distances from the center of rotation symmetry in an OAM mode multiplex reception apparatus that is separated from the OAM mode multiplex transmission apparatus, the calibration system comprising:

a receiving-side correction coefficient calculation unit configured to calculate a receiving-side correction coefficient for calibrating the characteristic difference between the reception units based on a propagation path estimation matrix that has, as a matrix element, a propagation path estimation value of each propagation path from the transmission units to the reception units in the plurality of transmission units and the plurality of reception units; and a transmitting-side correction coefficient calculation unit configured to calculate, based on the propagation path estimation matrix, a transmitting-side correction coefficient for calibrating the characteristic difference between the transmission units.

This application is based upon and claims the benefit of priority from Japanese Patent Application No. 2018-138274, filed on Jul. 24, 2018, the disclosure of which is incorporated herein in its entirety by reference.

REFERENCE SIGNS LIST

1 OAM Multiplex Mode Transmission System
10, 40 OAM Mode Multiplex Transmission Apparatus
11 Antenna Part
11A Transmission Antenna Element
12 Transmission Radio Unit
13 Transmission Unit
20 OAM Mode Multiplex Reception Apparatus
21 Antenna Part
21A Reception Antenna Element
22 Reception Radio Unit
23 Reception Unit
24 Propagation Path Estimation Unit
30, 60, 70, 80, 100 Calibration Control Apparatus
31, 71 Receiving-side Correction Coefficient Calculation Unit
50, 90, 110 Calibration Control Apparatus
51 Acquisition Unit
52, 91, 111 Correction Coefficient Forming Unit
61, 72, 81, 101 Feedback Signal Forming Unit
71A, 72A Singular Value Decomposition Processing Unit
71B Reception Characteristic Variation Matrix Calculation Unit
71C Receiving-side Correction Coefficient Calculation Processing Unit
72B, 111A Transmission Characteristic Variation Matrix Calculation Unit
73C, 91A Transmitting-side Correction Coefficient Calculation Unit
73D, 81A, 101A Formation Processing Unit

What is claimed is:

1. A calibration control apparatus configured to calibrate a characteristic difference between reception units in a plurality of reception units, the plurality of reception units receiving a signal transmitted from an orbital angular momentum (OAM) mode multiplex transmission apparatus comprising a plurality of transmission units including a plurality of respective transmission antenna elements arranged in a rotationally symmetric manner and at equal distances from the center of rotation symmetry, the plurality of reception units further comprising a plurality of respective reception antenna elements arranged in a rotationally symmetric manner and at equal distances from the center of rotation symmetry in an OAM mode multiplex reception apparatus that is separated from the OAM mode multiplex transmission apparatus, the calibration control apparatus comprising:

hardware including at least one processor and at least one memory; and receiving-side correction coefficient calculation unit implemented at least by the hardware and that calculates a receiving-side correction coefficient for calibrating the characteristic difference between the reception units based on a propagation path estimation matrix that has, as a matrix element, a propagation path estimation value of each propagation path from the transmission units to the reception units in the plurality of transmission units and the plurality of reception units, wherein the receiving-side correction coefficient calculation unit comprises:

reception characteristic variation matrix calculation unit that calculates, based on a left singular vector matrix obtained by executing singular value decomposition on the propagation path estimation matrix, a reception characteristic variation matrix that relates to a characteristic variation between the reception units and is a diagonal matrix; and receiving-side correction coefficient calculation processing unit that calculates, based on the calculated reception characteristic variation matrix, a receiving-side correction coefficient for calibrating the characteristic difference between the reception units.

2. The calibration control apparatus according to claim 1, comprising feedback signal forming unit implemented at least by the hardware and that forms, based on the propagation path estimation matrix, a feedback signal to the OAM mode multiplex transmission apparatus, the feedback signal being used to form a transmitting-side correction coefficient for calibrating a characteristic difference between transmission units in the OAM mode multiplex transmission apparatus.

3. The calibration control apparatus according to claim 2, wherein the feedback signal forming unit forms, based on a right singular vector matrix obtained by executing singular value decomposition on the propagation path estimation matrix, a feedback signal to the OAM mode multiplex transmission apparatus, the feedback signal being used to form a transmitting-side correction coefficient for calibrating a characteristic difference between transmission units in the OAM mode multiplex transmission apparatus.

4. The calibration control apparatus according to claim 3, wherein the feedback signal forming unit comprises:

transmission characteristic variation matrix calculation unit that calculates, based on the right singular vector matrix, a transmission characteristic variation matrix that relates to the characteristic variation between the transmission units and is a diagonal matrix;

transmitting-side correction coefficient calculation unit that calculates, based on the calculated transmission characteristic variation matrix, a transmitting-side correction coefficient for calibrating a characteristic difference between the transmission units; and formation processing unit that forms the feedback signal including information regarding the calculated transmitting-side correction coefficient.

5. The calibration control apparatus according to claim 4, wherein the transmitting-side correction coefficient calculation unit calculates a transmitting-side correction coefficient that corresponds to each target transmission unit by calculating a ratio of a matrix element that corresponds to a reference transmission unit in the calculated transmission characteristic variation matrix to a matrix element that corresponds to the each target transmission unit including the reference transmission unit.

6. The calibration control apparatus according to claim 3, wherein the feedback signal forming unit comprises:
   transmission characteristic variation matrix calculation unit that calculates, based on the right singular vector matrix, a transmission characteristic variation matrix regarding a characteristic variation between the transmission units; and
   formation processing unit that forms the feedback signal including information regarding the calculated transmission characteristic variation matrix.

7. The calibration control apparatus claim 4, wherein the transmission characteristic variation matrix calculation unit calculates the transmission characteristic variation matrix by multiplying a discrete Fourier transform matrix by an inverse matrix of the right singular vector matrix.

8. The calibration control apparatus according to claim 3, wherein the feedback signal forming unit forms the feedback signal including information regarding the right singular vector matrix.

9. The calibration control apparatus according to claim 1, wherein the reception characteristic variation matrix calculation unit calculates the reception characteristic variation matrix by multiplying the left singular vector matrix by an inverse matrix of a discrete Fourier transform matrix.

10. The calibration control apparatus according to claim 9, wherein the receiving-side correction coefficient calculation processing unit calculates a receiving-side correction coefficient that corresponds to each target reception unit by calculating a ratio of a matrix element that corresponds to a reference reception unit in the calculated reception characteristic variation matrix to a matrix element that corresponds to the each target reception unit including the reference reception unit.

11. A calibration control apparatus configured to calibrate a characteristic difference between transmission units in a plurality of transmission units, the plurality of transmission units transmitting an OAM mode multiplex signal to an OAM mode multiplex reception apparatus comprising a plurality of reception units including a plurality of respective reception antenna elements arranged in a rotationally symmetric manner and at equal distances from the center of rotation symmetry, the plurality of transmission units further comprising a plurality of transmission antenna elements arranged in a rotationally symmetric manner and at equal distances from the center of rotation symmetry in an OAM mode multiplex transmission apparatus that is separated from the OAM mode multiplex reception apparatus, the calibration control apparatus comprising:
   hardware including at least one processor and at least one memory;
   acquisition unit implemented at least by the hardware and that acquires a feedback signal formed by the OAM mode multiplex reception apparatus based on a propagation path estimation matrix that has, as a matrix element, a propagation path estimation value of each propagation path from the transmission units to the reception units in the plurality of transmission units and the plurality of reception units; and
   correction coefficient forming unit implemented at least by the hardware and that forms, based on the acquired feedback signal, a transmitting-side correction coefficient for calibrating a characteristic difference between the transmission units in the OAM mode multiplex transmission apparatus, wherein
   the acquisition unit acquires the feedback signal formed by the OAM mode multiplex reception apparatus based on a right singular vector matrix obtained by executing singular value decomposition on the propagation path estimation matrix, the feedback signal including information regarding a transmission characteristic variation matrix that relates to a characteristic variation between the transmission units and is a diagonal matrix, the characteristic variation between the transmission units being calculated based on the right singular vector matrix in the OAM mode multiplex reception apparatus, and
   the correction coefficient forming unit comprises a transmitting-side correction coefficient calculation unit that calculates a transmitting-side correction coefficient that corresponds to each target transmission unit by calculating a ratio of a matrix element that corresponds to a reference transmission unit in the transmission characteristic variation matrix to a matrix element that corresponds to the each target transmission unit including the reference transmission unit.

12. A calibration control apparatus configured to calibrate a characteristic difference between transmission units in a plurality of transmission units, the plurality of transmission units transmitting an OAM mode multiplex signal to an OAM mode multiplex reception apparatus comprising a plurality of reception units including a plurality of respective reception antenna elements arranged in a rotationally symmetric manner and at equal distances from the center of rotation symmetry, the plurality of transmission units further comprising a plurality of transmission antenna elements arranged in a rotationally symmetric manner and at equal distances from the center of rotation symmetry in an OAM mode multiplex transmission apparatus that is separated from the OAM mode multiplex reception apparatus, the calibration control apparatus comprising:
   hardware including at least one processor and at least one memory;
   acquisition unit implemented at least by the hardware and that acquires a feedback signal formed by the OAM mode multiplex reception apparatus based on a propagation path estimation matrix that has, as a matrix element, a propagation path estimation value of each propagation path from the transmission units to the reception units in the plurality of transmission units and the plurality of reception units; and
   correction coefficient forming unit implemented at least by the hardware and that forms, based on the acquired feedback signal, a transmitting-side correction coefficient for calibrating a characteristic difference between the transmission units in the OAM mode multiplex transmission apparatus, wherein
   the acquisition unit acquires the feedback signal formed by the OAM mode multiplex reception apparatus based on a right singular vector matrix obtained by executing singular value decomposition on the propagation path estimation matrix, the feedback signal including information regarding the right singular vector matrix, and
   the correction coefficient forming unit comprises:
   transmission characteristic variation matrix calculation unit that calculates, based on the right singular vector matrix, a transmission characteristic variation matrix that relates to a characteristic variation between the transmission units and is a diagonal matrix; and transmitting-side correction coefficient calculation unit that calculates, based on the calculated transmission characteristic variation matrix, a transmitting-side correction coefficient for calibrating a characteristic difference between the transmission units.

13. The calibration control apparatus according to claim 12, wherein the transmission characteristic variation matrix calculation unit calculates the transmission characteristic variation matrix by multiplying the right singular vector matrix by an inverse matrix of a discrete Fourier transform matrix.

14. A calibration control method for calibrating a characteristic difference between reception units in a plurality of reception units including a plurality of respective reception antenna elements arranged in a rotationally symmetric manner and at equal distances from the center of rotation symmetry in an OAM mode multiplex reception apparatus configured to receive a signal transmitted from an OAM mode multiplex transmission apparatus comprising a plurality of transmission units including a plurality of respective transmission antenna elements arranged in a rotationally symmetric manner and at equal distances from the center of rotation symmetry, the calibration control method comprising:

first calculating a reception characteristic variation matrix regarding a characteristic variation between the reception units based on a propagation path estimation matrix that has, as a matrix element, a propagation path estimation value of each propagation path from the transmission units to the reception units in the plurality of transmission units and the plurality of reception units, and second calculating, based on the calculated reception characteristic variation matrix, a receiving-side correction coefficient for calibrating the characteristic difference between the reception units, wherein the first calculating includes calculating, based on a left singular vector matrix obtained by executing singular value decomposition on the propagation path estimation matrix, a reception characteristic variation matrix that relates to a characteristic variation between the reception units and is a diagonal matrix.

\* \* \* \* \*